United States Patent

[11] 3,626,223

[72] Inventor Richard J. Maier
 Pontiac, Mich.
[21] Appl. No. 20,911
[22] Filed Mar. 19, 1970
[45] Patented Dec. 7, 1971
[73] Assignee Syncro Corporation
 Oxford, Mich.

[54] GENERATOR CONSTRUCTION
 4 Claims, 3 Drawing Figs.
[52] U.S. Cl............................................ 310/153,
 310/156, 310/168, 310/263
[51] Int. Cl....................................... H02k 21/22
[50] Field of Search............................. 310/156,
 263, 67, 67.1, 267, 153, 164, 165, 218, 162, 168,
 70, 74

[56] References Cited
 UNITED STATES PATENTS

| 2,568,479 | 9/1951 | Armstrong et al. | 310/153 |
| 2,692,957 | 10/1954 | Clark et al. | 310/156 |
| 2,976,439 | 3/1961 | Kiekhaefer | 310/153 |
| 3,517,234 | 6/1970 | Maier | 310/67 X |
| 3,444,402 | 5/1969 | Cartier | 310/257 X |

FOREIGN PATENTS

| 201,087 | 11/1938 | Switzerland | 310/156 |

Primary Examiner—D. F. Duggan
Assistant Examiner—B. A. Reynolds
Attorney—Harness, Dickey & Pierce ABSTRACT: A generator having a pair of armature bodies with interdigitating fingers on each of the armature bodies defining magnetic poles of opposite polarity with one of the armature bodies being nested in the other and with the fingers of each extending in the same axial direction.

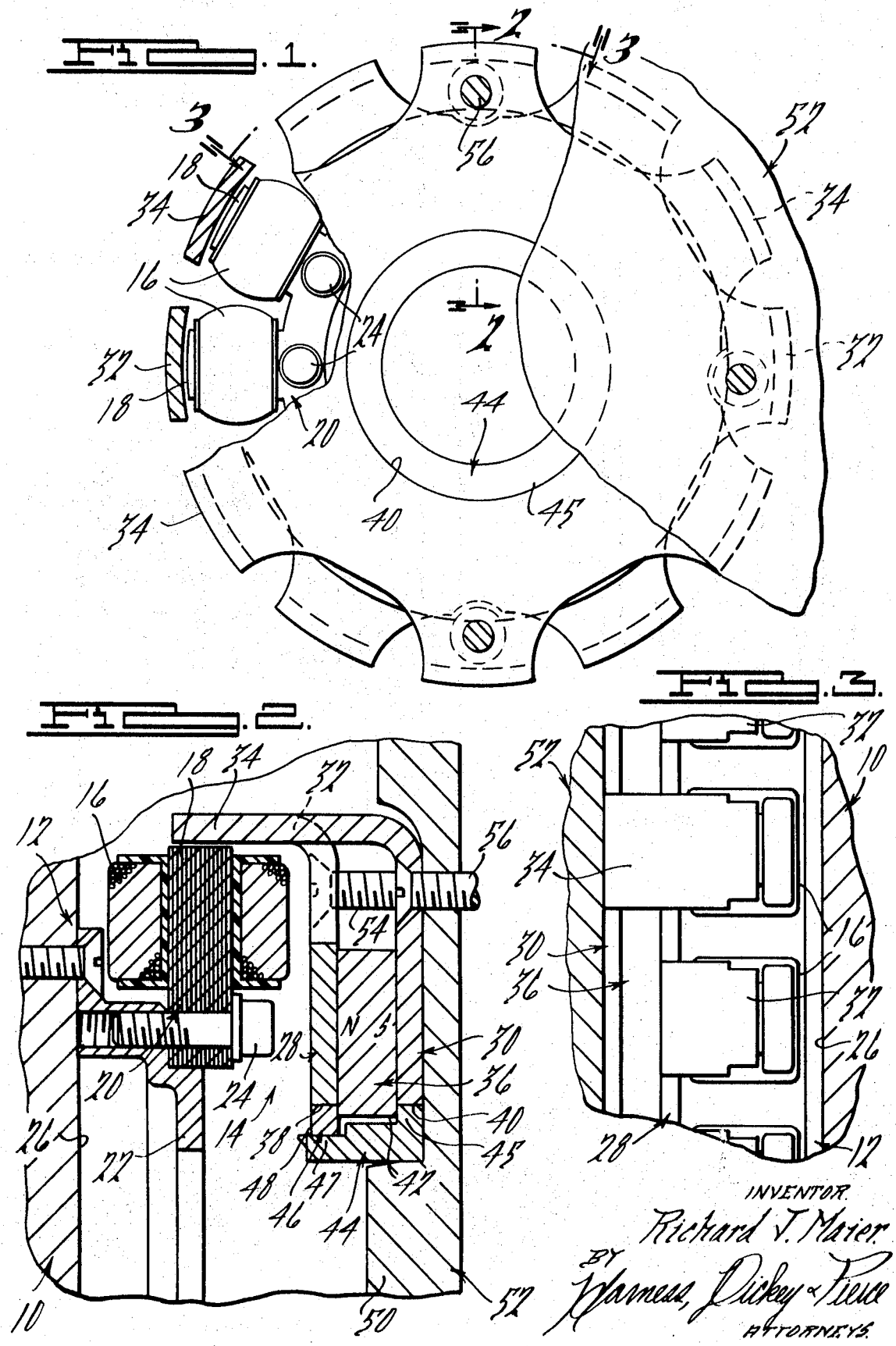

GENERATOR CONSTRUCTION

SUMMARY—BACKGROUND OF THE INVENTION

The present invention relates to generator constructions.

In structures using armatures having fingers defining poles, the armatures are usually mounted with the fingers of one extending axially towards the other armature. In many cases the field winds are located between the armatures thereby requiring slip rings; in addition the stator output windings, are circumferentially disposed and must be located concentrically with the armature fingers. In the present invention the armature bodies are nested with the fingers of each extending in the same axial direction; at the same time, the stator and output windings are located externally of the armature bodies but proximate to the fingers. By use of a permanent magnet to provide the field, this structure does not require slip rings. In addition this structure, because of its simplicity, is extremely versatile and can be readily located within a preexisting structure such as a flywheel, ring gear, etc. In addition this structure readily permits location of the stator and load windings either radially inwardly or radially outwardly of the fingers. Therefore it is an object of the present invention to provide a new and improved generator structure having armature bodies with interdigitating fingers and constructed such that slip rings are not required. It is another object to provide a generator of the above type which readily lends itself for mounting to a preexisting structure such as a flywheel. It is another general object of the present invention to provide a new and improved generator construction.

Other objects, features, and advantages of the present invention will become apparent from the subsequent description and the appended claims, taken in conjunction with the accompanying drawing, in which:

FIG. 1 is a front elevational view of a generator assembly embodying features of the present invention with some parts broken away;

FIG. 2 is a sectional view of the assembly of FIG. 1 taken generally along the line 2—2; and FIG. 3 is a view taken generally in the direction of the arrows 3—3.

The alternator assembly is generally indicated by the numeral 10 and includes a stator assembly 12 and a rotor assembly 14. The stator assembly includes a plurality of output or load windings 16 wound upon a plurality of poles 18 which are a part of and extend radially outwardly from a ring 20. The ring 20 with its poles 18 is a laminated structure made of a ferrous material having a low magnetic reluctance. The stator ring 20 is secured to a mounting ring 22 via a plurality of bolts 24. The mounting ring 22 in turn is adapted to be mounted to a suitable mounting surface 26 on an engine (only generally shown).

The rotor assembly 14 includes a pair of generally flat armature members 28 and 30 each of which has a plurality of radial fingers 32 and 34, respectively, which are bent to extend axially. The fingers 32 and 34, are equally, circumferentially disposed and the armatures 28 and 30 are located one in front of the other so that the fingers 32 extend in the same axial direction as the fingers 34. The armatures 28 and 30 are indexed relative to each other, however, so that the fingers 32 and 34 are interdigitated with each other. An annular, permanent magnet 36 is sandwiched in between and in contact with armatures 28 and 30 and has its north and south poles oriented in the manner shown in FIG. 2. The magnet 36 is preferably a ceramic magnet of the barium ferrite type. This type of ceramic magnet material can be shallow while still providing a high coercive force and in contrast to an Alnico magnet of the same coercive force, the ceramic magnet can be thinner resulting in a more compact structure. The flat armatures 28 and 30 have in line bores 38 and 40, respectively, which are coaxial with the central bore 42 in magnet 36. A pilot ring 44 has a stepped outer surface with a large diameter portion 45 located in bore 40. A support ring 46 is located in bore 38 and on a small diameter shoulder 47 on pilot ring 44. The magnet 36 is clamped between radial surfaces of the ring 46 and large diameter portion 45 by an upturned lip 48.

The pilot ring 44 is adapted to pilot upon an axially extending hub 50 of a flywheel 52 to thereby properly radially locate the rotor assembly 14. In addition, the rotor assembly 14 is fixed to the flywheel 52 for rotation therewith by brass screwed 54 and 56 through armatures 28 and 30, respectively. The fingers 34 are longer than fingers 32 so that their outer ends are generally in axial alignment and both are located slightly radially outwardly from but in alignment with the poles 18 on stator assembly 12. The armatures 28 and 30 are made of a ferrous material having a low magnetic reluctance while the pilot ring 44 and ring 46 are made of aluminum which has a high reluctance. Thus the main path for magnetic flux from magnet 36 will be through armature 28, fingers 32, some of the poles 18, the body of ring 20, the others of the poles 18, fingers 34 and armature 30 back to magnet 36.

The above construction is compact and versatile. Notice that it readily fits between the flywheel and adjacent face of the engine. By constructing the armatures to have fingers extending in the same axial direction the stator assembly can be located either radially inwardly or radially outwardly relative to the fingers of the rotor assembly and when a permanent magnet is used the need for slip rings is obviated. In addition with the design as shown the armatures can be made of inexpensive sheet steel. The total result is a generally inexpensive structure which is versatile in application.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. An electrical generator for use with an engine having a flywheel comprising: a stator assembly having a plurality of circumferentially disposed poles, a rotor assembly having a first plurality of axially extending fingers interdigitated with a second plurality of axially extending fingers with said first and second pluralities of fingers extending in the same axial direction towards said poles, said rotor assembly including magnet means for providing magnetic flux of opposite polarities to said first and second pluralities of fingers, said rotor assembly including a first armature having said first plurality of fingers and a second armature having said second plurality of fingers, both of said armatures being constructed of flat sheet stock, said magnet means comprising a permanent magnet located between said first and second armatures, said armatures each including a radially extending substantially flat ring portion, said flywheel having a hub portion and having a radially extending, generally flat disc portion connected thereto, first means mounting said rotor assembly on said flywheel with one of said ring portions being secured against said flat disc portion and second means mounting said stator assembly on an adjacent surface of the engine.

2. The generator of claim 1 with said first and second pluralities of fingers axially extending from said corresponding ring portion, one of said pluralities of fingers being axially longer than the other of said pluralities of fingers whereby both said pluralities of fingers are located in radial alignment with said poles of said stator assembly.

3. The generator of claim 2 with said flywheel having a hub portion and with said first means comprising a pilot ring cooperating with said hub portion to properly locate said rotor assembly.

4. The generator of claim 3 with said second means comprising an adapter ring cooperating with said engine surface to properly locate said stator assembly on the engine relative to said flywheel and hence relative to said rotor assembly.

* * * * *